US012637535B2

(12) United States Patent
Laas et al.

(10) Patent No.: US 12,637,535 B2
(45) Date of Patent: May 26, 2026

(54) NON-IONIC HYDROPHILIZED POLYISOCYANATES HAVING A VERY LOW MONOMER CONTENT

(71) Applicant: Covestro Deutschland AG, Leverkusen (DE)

(72) Inventors: Hans-Josef Laas, Odenthal (DE); Claudine Stoye, Cologne (DE); Patrick Franke, Reichshof Heischeid (DE)

(73) Assignee: Covestro Deutschland AG, Leverkusen (DE)

( * ) Notice: Subject to any disclaimer, the term of this patent is extended or adjusted under 35 U.S.C. 154(b) by 407 days.

(21) Appl. No.: 18/267,164

(22) PCT Filed: Dec. 15, 2021

(86) PCT No.: PCT/EP2021/085844

§ 371 (c)(1),
(2) Date: Jun. 14, 2023

(87) PCT Pub. No.: WO2022/129140

PCT Pub. Date: Jun. 23, 2022

(65) Prior Publication Data

US 2024/0010784 A1 Jan. 11, 2024

(30) Foreign Application Priority Data

Dec. 15, 2020 (EP) .................................... 20214008

(51) Int. Cl.
| | |
|---|---|
| *C08G 18/79* | (2006.01) |
| *C08G 18/02* | (2006.01) |
| *C08G 18/10* | (2006.01) |
| *C08G 18/28* | (2006.01) |
| *C08G 18/73* | (2006.01) |
| *C08G 18/78* | (2006.01) |
| *C09D 175/04* | (2006.01) |

(52) U.S. Cl.
CPC ......... *C08G 18/798* (2013.01); *C08G 18/027* (2013.01); *C08G 18/10* (2013.01); *C08G 18/283* (2013.01); *C08G 18/73* (2013.01); *C08G 18/7837* (2013.01); *C08G 18/792* (2013.01); *C08G 18/797* (2013.01); *C09D 175/04* (2013.01); *C08G 2150/00* (2013.01)

(58) Field of Classification Search
CPC .... C08G 18/798; C08G 18/027; C08G 18/10; C08G 18/283; C08G 18/73; C08G 18/7837; C08G 18/792; C08G 18/797
See application file for complete search history.

(56) References Cited

U.S. PATENT DOCUMENTS

| | | | |
|---|---|---|---|
| 3,996,223 A | 12/1976 | Gupta et al. | |
| 4,255,569 A | 3/1981 | Muller et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,064,960 A | 11/1991 | Pedain et al. | |
| 5,076,958 A | 12/1991 | Pedain et al. | |
| 5,252,696 A * | 10/1993 | Laas ................... | C08G 18/798 |
| | | | 528/49 |

| | | | |
|---|---|---|---|
| 5,814,689 A * | 9/1998 | Goldstein .......... | C08G 18/7837 |
| | | | 528/45 |
| 5,914,383 A * | 6/1999 | Richter ................ | C07D 273/04 |
| | | | 540/200 |
| 6,107,484 A | 8/2000 | Richter et al. | |
| 9,440,937 B2 | 9/2016 | Richter et al. | |
| 9,850,338 B2 | 12/2017 | Richter | |
| 9,926,402 B2 | 3/2018 | Laas et al. | |
| 10,131,736 B2 | 11/2018 | Richter | |
| 10,167,358 B2 | 1/2019 | Richter | |
| 10,472,455 B2 | 11/2019 | Laas et al. | |
| 2004/0106762 A1 | 6/2004 | Charriere et al. | |
| 2023/0192937 A1 * | 6/2023 | Laas ..................... | C08G 18/10 |
| | | | 528/76 |

FOREIGN PATENT DOCUMENTS

| | | | | |
|---|---|---|---|---|
| DE | 1954093 A1 | 6/1970 | | |
| DE | 1670666 A1 | 7/1971 | | |
| DE | 2414413 A1 | 10/1975 | | |
| DE | 2452532 A1 | 5/1976 | | |
| DE | 2641380 A1 | 3/1978 | | |
| DE | 3700209 A1 | 7/1988 | | |
| DE | 3900053 A1 | 7/1990 | | |
| DE | 3928503 A1 | 3/1991 | | |
| EP | 0330966 B1 | 9/1989 | | |
| EP | 0336205 A2 | 10/1989 | | |
| EP | 0339396 A2 | 11/1989 | | |
| EP | 0798299 A1 | 10/1997 | | |
| EP | 0850896 A1 | 7/1998 | | |
| EP | 0959087 A1 | 11/1999 | | |
| EP | 0962454 A1 | 12/1999 | | |
| EP | 0962455 A1 | 12/1999 | | |
| EP | 0986009 A2 | 3/2000 | | |
| EP | 2883895 A1 | 6/2015 | | |
| EP | 2785760 B1 | 12/2016 | | |
| EP | 3107922 B1 | 4/2018 | | |
| EP | 3107948 B1 | 1/2019 | | |
| EP | 3428207 A1 * | 1/2019 | .......... | C08G 18/092 |
| EP | 3337836 B1 | 7/2019 | | |
| EP | 3543270 A1 | 9/2019 | | |
| EP | 3428207 B1 | 11/2019 | | |
| GB | 1145952 A | 3/1969 | | |
| GB | 1244416 A | 9/1971 | | |
| WO | 2016146474 A1 | 9/2016 | | |
| WO | 2018153801 A1 | 8/2018 | | |

OTHER PUBLICATIONS

Lass et al., The Synthesis of Aliphatic Polyisocyanates Containing Biuret, Isocyanurate or Uretdione Backbones for Use in Coatings, J. prakt Chem 1994, pp. 185-200, 336.

Maasen et al., Ullmanns Encyklopadie der technischen Chemie, 1984, pp. 31-38, vol. 19, 4th edition.

* cited by examiner

*Primary Examiner* — Michael L Leonard

(74) *Attorney, Agent, or Firm* — The Webb Law Firm

(57) ABSTRACT

The invention relates to a process for producing hydrophilically modified polyisocyanates having a very low content of monomeric diisocyanates, to the polyisocyanates obtainable or obtained by said process and to the use thereof for producing polyurethane plastics. The invention further relates to coating compositions containing the nonionically hydrophilized polyisocyanates and to the substrates coated with these coating compositions.

15 Claims, No Drawings

NON-IONIC HYDROPHILIZED POLYISOCYANATES HAVING A VERY LOW MONOMER CONTENT

CROSS-REFERENCE TO RELATED APPLICATIONS

This application is the United States national phase of International Application No. PCT/EP2021/085844 filed Dec. 15, 2021, and claims priority to European Patent Application No. 20214008.3 filed Dec. 15, 2020, the disclosures of which are hereby incorporated by reference in their entireties.

BACKGROUND OF THE INVENTION

Field of the Invention

The present invention relates to a process for producing hydrophilically modified polyisocyanates having a low content of monomeric diisocyanates, to the polyisocyanates obtainable or obtained by said process and to the use thereof for producing polyurethane plastics. The invention further relates to coating compositions containing the nonionically hydrophilized polyisocyanates and to the substrates coated with these coating compositions.

Description of Related Art

Aqueous coatings systems are nowadays firmly established for various fields of application as an eco-friendly alternative to solvent-borne coating compositions. Hydrophilically modified polyisocyanates play a particular role as a raw material for qualitatively upscale aqueous coatings since, as water-dispersible crosslinker components, they allow formulation of aqueous two-component polyurethane (2K-PUR) coatings.

A simple and inexpensive method for producing water-dispersible polyisocyanates is the partial reaction of hydrophobic polyisocyanates with hydrophilic polyether alcohols (see for example EP-A 0 959 087, page 2, lines 25-46). On an industrial scale this reaction is typically performed at temperatures of about 80° C. to 130° C. to ensure economically acceptable reaction times.

However, in the hydrophilization of polyisocyanates containing uretdione structures in this temperature range the thermolability thereof can become disadvantageously apparent and lead to a marked increase in monomeric diisocyanates.

Hydrophilic polyisocyanates will in future also fall under the restrictions imposed by the European Chemicals Agency (ECHA) on handling substances or mixtures having a content of free monomeric diisocyanates of 0.10% by weight or more. For safe commercial use as crosslinker components in aqueous 2K PUR coatings, hydrophilic polyisocyanates comprising less than 0.10% of monomeric diisocyanates are desired.

EP 3 543 270 A1 relates to a catalyst system for uretdione dispersions, wherein no hydrophilic polyisocyanates having a residual monomer content of less than 0.10% by weight based on the solids content are described. U.S. Pat. No. 5,252,696 A and EP 0 850 896 A1 describe water-dispersible polyisocyanates without elaborating on the residual monomer content for example. WO2016/146474 A1 discloses silane-containing polyisocyanates in organic solvents. EP 3 428 207 A1 describes hydrophilic polyisocyanate compositions with specific ratios of uretonimine and iminooxadiazinedione groups in each case based on the isocyanurate groups present, thus resulting in a ratio of uretonimine to uretdione groups of 0.20 to 50 mol %. The uretonimine groups are intentionally formed by heating the polyisocyanates before the hydrophilization reaction. The disadvantage of this is that the thermally labile uretonimine groups must necessarily be present and there is no guarantee that the content of monomeric diisocyanates can reliably be kept below 0.10% by weight.

However, even very small amounts of uretdione structures in a hydrophobic polyisocyanate can cause the monomer content to rise to values markedly higher than 0.10% by weight during the reaction with hydrophilic polyether alcohols under the usual conditions by reverse cleavage, even if the hydrophobic polyisocyanate initially had a diisocyanate content less than 0.10% by weight.

SUMMARY OF THE INVENTION

It is accordingly an object of the present invention to provide a novel process for producing nonionically hydrophilized polyisocyanates by which uretdione- and optionally uretonimine-containing hydrophobic polyisocyanates may be reacted with hydrophilic polyether alcohols without uretdione cleavage and uretonimine cleavage resulting in a noticeable increase in monomeric diisocyanates above 0.10% by weight.

This object was achieved by providing the process more particularly described hereinbelow. The process according to the invention is based on the surprising observation that the tendency for uretdione cleavage and uretonimine cleavage and thus the increase in the content of monomeric diisocyanates is correlated to a great extent with the quality of the employed polyether alcohols. The polyether alcohols employed for the polyisocyanate hydrophilization are typically produced by alkali metal-catalyzed addition of alkylene oxides, in particular ethylene oxide, onto starter molecules having at least one active hydrogen atom. Following the addition reaction, the alkaline catalyst is then generally neutralized with an inorganic or organic acid and the resulting salt is removed from the polyether alcohol. It has now been found that, surprisingly, the reaction of uretdione- and optionally uretonimine-containing polyisocyanates with hydrophilic polyether alcohols neutralized with phosphoric acid or phosphoric esters result in a marked increase in monomeric diisocyanates while no uretdione cleavage and uretonimine cleavage is observable upon reaction with phosphorus-free polyether alcohols or those comprising less than 50 ppm of phosphorus.

The present invention relates to a process for producing hydrophilically modified polyisocyanates having a content of monomeric diisocyanates of less than 0.10% by weight based on the solids content of the hydrophilically modified polyisocyanates comprising reaction of A) at least one polyisocyanate component having aliphatically, cycloaliphatically, araliphatically and/or aromatically bonded isocyanate groups which comprises at least uretdione structures and less than mol % of uretonimine structures based on the uretdione structures with B) at least one nonionically hydrophilic organic compound comprising at least one isocyanate-reactive group, wherein the nonionically hydrophilic organic compound B) has a content of phosphorus of not more than ppm and the total content of phosphorus based on components A) and B) of the hydrophilically modified polyisocyanate is not more than 20 ppm.

The invention also provides nonionically hydrophilized polyisocyanates comprising uretdione structures and less than 0.20 mol % of uretonimine structures based on the uretdione structures and less than 0.1% by weight of monomeric diisocyanates based on the solids content of the hydrophilically modified polyisocyanates and not more than 20 ppm of phosphorus and provides for the use thereof as starting components in the production of polyurethane plastics, in particular as crosslinkers for water-soluble or -dispersible coatings binders or coatings binder components having isocyanate-reactive groups in the production of coatings using aqueous coating compositions based on such binders or binder components.

DESCRIPTION OF THE INVENTION

According to the invention, the terms "comprising" or "containing" preferably mean "consisting essentially of" and particularly preferably mean "consisting of". The further embodiments identified in the claims and in the description can be combined arbitrarily, provided the context does not clearly indicate that the opposite is the case.

An "organic compound" or "organic radical" contains at least one unit comprising a covalent carbon-hydrogen bond.

The term "aliphatic" is presently defined as meaning non-aromatic hydrocarbon groups that are saturated or unsaturated.

The term "araliphatic" is presently defined as meaning hydrocarbon radicals consisting of both an aromatic hydrocarbon radical and a saturated or unsaturated hydrocarbon group which is bonded directly to the aromatic radical.

The term "alicyclic" or "cycloaliphatic" is presently defined as meaning optionally substituted carbocyclic or heterocyclic compounds or units which are not aromatic.

The term "hydrophilic" is presently defined as a water solubility of a compound of at least 500 g/litre, preferably complete water solubility, and the term "hydrophobic" as a water solubility of a compound of not more than 100 g/litre, preferably complete insolubility in water, in each case determined at 20° C.

"At least one", as used herein, refers to 1 or more, for example 2, 3, 4, 5, 6, 7, 8, 9 or more. In connection with constituents of the compounds described herein, this FIGURE relates not to the absolute number of molecules, but to the nature of the constituent. "At least one nonionically hydrophilic organic compound" is therefore to be understood as meaning for example that only one type of compound or two or more different types of compounds of this type may be present without specifying the amount of the individual compounds.

Numerical ranges given in the format "in/from x to y" include the values stated. If two or more preferred numerical ranges are given in this format, it is understood that all ranges arising from the combination of the various end points are likewise encompassed.

Suitable polyisocyanates A) for the process according to the invention are any desired polyisocyanates produced by modification of simple aliphatic, cycloaliphatic, araliphatic and/or aromatic diisocyanates comprising at least uretdione structures.

Suitable diisocyanates for producing the polyisocyanates A) are obtainable by various means, for example by phosgenation of the corresponding diamines in the liquid or gas phase or by a phosgene-free route such as for example by thermal urethane cleavage. Preferred diisocyanates are those of molecular weight range 140 to 400 having aliphatically, cycloaliphatically, araliphatically and/or aromatically bonded isocyanate groups, examples being 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 2,4'- and 4,4'-diisocyanatodicyclohexylmethane, 1-isocyanato-1-methyl-4(3)isocyanatomethylcyclohexane, bis(isocyanatomethyl)norbornane, 1,3- and 1,4-bis(isocyanatomethyl)benzene (xylylene diisocyanate, XDI) 1,3- and 1,4-bis(2-isocyanatoprop2-yl)benzene (tetramethylxylylene diisocyanate, TMXDI), 2,4- and 2,6-diisocyanatotoluene (TDI), 2,4'- and 4,4'-diisocyanatodiphenylmethane (MDI), 1,5-diisocyanatonaphthalene or mixtures of at least two such diisocyanates.

In addition to uretdione structures the polyisocyanates A) employed in the process according to the invention can optionally also comprise isocyanurate, iminooxadiazinedione, allophanate, biuret, urethane and/or oxadiazinetrione structures.

Production of the polyisocyanates A) is carried out according to methods known per se, such as are described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396, EP-A 0 798 299, EP-A 0 986 009, EP-A 0 962 454, EP-A 0 962 455, EP-A 2 785 760, EP-A 2 883 895, EP-A 3 107 922, EP-A 3 107 948 and EP-A 3 337 836.

In the production of these polyisocyanates A) the actual modification reaction is generally followed by a further process step for removing the unreacted excess monomeric diisocyanates. This removal of monomers is effected by processes known per se, preferably by thin-film distillation under reduced pressure or by extraction with suitable solvents inert toward isocyanate groups, for example aliphatic or cycloaliphatic hydrocarbons such as pentane, hexane, heptane, cyclopentane or cyclohexane.

The process according to the invention preferably employs polyisocyanates A) that have a content of monomeric diisocyanates of less than 0.14% by weight, preferably less than 0.12% by weight, particularly preferably of less than 0.10% by weight. The residual monomer contents are determined in accordance with DIN EN ISO 10283:2007-11 by gas chromatography using an internal standard.

Depending on its particular production process the polyisocyanate component A) employed in the process according to the invention may optionally contain phosphorus in an amount of up to 28 ppm, preferably up to 25 ppm, particularly preferably up to 20 ppm, which is in the form of arrested oligomerization catalysts for example. In the context of the present invention the determination of these phosphorus content is carried out by inductively coupled plasma atomic emission spectroscopy (ICP-OES) according to DIN EN ISO 11885:2009-09 after microwave digestion. The limit of detection for phosphorus with this method is <1 ppm.

The polyisocyanates A) comprise uretdione structures and the content of uretdione structures is preferably at least 0.6 mol %, more preferably from 0.8 to 25 mol %, particularly preferably from 1 to 20 mol %, very particularly preferably from 1 to 15 mol %, in each case based on the total amount of all uretdione, optionally isocyanurate, iminooxadiazinedione, allophanate, biuret, urethane and/or oxadiazinetrione structures present in the polyisocyanate, wherein the total amount of all iminooxadiazinedione, uretdione, isocyanurate, allophanate, biuret, urethane and/or oxadiazinetrione structures present in the polyisocyanate sums to 100 mol %. If detectable at all, the content of uretonimine structures in the polyisocyanates A) is less than 0.20 mol %, preferably less than 0.15 mol %, particularly preferably less than 0.10 mol %, based on the uretdione structures.

The contents (mol %) of the uretdione, optionally isocyanurate, iminooxadiazinedione, allophanate, biuret, urethane and/or oxadiazinetrione structures present in the polyisocyanates A) are calculated from the integrals of proton-decoupled $^{13}$C-NMR spectra and are in each case based on the sum of uretdione, isocyanurate, allophanate, biuret, iminooxadiazinedione and/or oxadiazinetrione structures present. The contents (mol %) of any uretonimine structures present in the polyisocyanates A) were likewise calculated from the integrals of the proton-decoupled $^{13}$C-NMR spectra and refer to uretdione structures. In the case of HDI polyisocyanates in CDCl$_3$, the individual structural elements have the following chemical shifts (in ppm): uretdione: 157.1; isocyanurate: 148.4; iminooxadiazinedione: 147.8, 144.3 and 135.3; allophanate: 155.7 and 153.8, biuret: 155.5; urethane: 156.3; oxadiazinetrione: 147.8 and 143.9; uretonimine 158.7 and 144.6.

Suitable polyisocyanates A) also include any desired mixtures of at least two polyisocyanates of the recited type, wherein these mixtures may also employ polyisocyanates that are completely free from uretdione structures, provided the mixtures correspond to what is specified above for the polyisocyanates A) in terms of the contents of uretdione and uretonimine structures.

Preferred polyisocyanates A) are those of the recited type which also contain at least isocyanurate structures in addition to uretdione structures.

If used at all, polyisocyanates having araliphatically and/or aromatically bonded isocyanate groups are preferably employed in amounts of not more than 20% by weight, particularly preferably of not more than 10% by weight, based on the total amount of polyisocyanates A) Particularly preferred polyisocyanates A) for the process according to the invention are those of the recited type having exclusively aliphatically and/or cycloaliphatically bonded isocyanate groups which are free from uretonimine groups or in which uretonimine groups are not detectable.

Very particularly preferred polyisocyanates A) are those based on PDI, HDI, IPDI and/or 2,4'- and 4,4'-diisocyanatodicyclohexylmethane.

The polyisocyanates A) recited above as suitable, preferred, particularly preferred and very particularly preferred contain uretdione structures and optionally preferably isocyanurate structures and have an average NCO functionality of 2.3 to 5.0, preferably of 2.5 to 4.5, and a content of isocyanate groups of 6.0 to 26.0% by weight, preferably of 8.0 to 25.0% by weight, particularly preferably 10.0 to 24.0% by weight.

Starting compounds B) for the process according to the invention are any desired nonionically hydrophilic organic compounds having at least one isocyanate-reactive group and having a phosphorus content of not more than 50 ppm. The isocyanate-reactive silane compounds explicitly recited in WO 2016/146474 A1 are preferably excepted from the starting compounds B) of the present invention.

Suitable starting compounds B) are for example monohydric or polyhydric polyalkylene oxide polyether alcohols having a statistical average of 5 to 50 ethylene oxide units per molecule, as obtainable in a manner known per se by alkoxylation of suitable starter molecules (see for example Ullmanns Encyclopädie der technischen Chemie, 4th edition, volume 19, Verlag Chemie, Weinheim pp. 31-38). Such starter molecules may include for example any desired mono- or polyhydric alcohols of molecular weight range 32 to 300, for example methanol, ethanol, n-propanol, isopropanol, n-butanol, isobutanol, sec-butanol, the isomeric pentanols, hexanols, octanols and nonanals, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl)isocyanurate.

Alkylene oxides suitable for the alkoxylation reaction are especially ethylene oxide and propylene oxide and these may be employed in the alkoxylation reaction in any desired sequence or else in admixture. Suitable polyether alcohols are either pure polyethylene oxide polyether alcohols or mixed polyalkylene oxide polyethers whose alkylene oxide units consist to an extent of at least 70 mol %, preferably to an extent of at least 80 mol %, of ethylene oxide units.

Preferred polyalkylene oxide polyether alcohols B) are those produced using the abovementioned monoalcohols of molecular weight range 32 to 150 as starter molecules. It is more preferable when the nonionically hydrophilic organic compound B) is selected from monohydric or polyhydric polyalkylene oxide polyether alcohols having a statistical average of 5 to 50 ethylene oxide units, particularly preferably 5 to 25 ethylene oxide units, per molecule. Particularly preferred polyether alcohols are pure polyethylene glycol monomethyl ether alcohols having a statistical average of 5 to 50, especially preferably 5 to 25 ethylene oxide units.

The nonionically hydrophilic compounds B) preferably have a pH, measured as a 5% solution in water, of 4.0 to 8.0, preferably of 4.5 to 7.5, particularly preferably of 5.0 to 7.0.

In the process according to the invention the employed amount of nonionically hydrophilic compounds B) may be freely chosen over a wide range. Nonionically hydrophilic compounds B) are preferably employed in the process according to the invention in amounts of up to 30% by weight, particularly preferably from 2% to 25% by weight, very particularly preferably from 5 to 20% by weight and in particular from 9% to 17% by weight, based on the total amount of the employed starting components A) and B).

It is essential to the present invention that the nonionically hydrophilic compounds B) have a content of phosphorus of not more than 50 ppm, preferably of not more than 40 ppm, particularly preferably of not more than 30 ppm and very particularly preferably comprise no detectable phosphorus, wherein the phosphorus content are determined by inductively coupled plasma atomic emission spectroscopy (ICP-OES) according to DIN EN ISO 11885:2009-09 after microwave digestion. The limit of detection for phosphorus with this method is <1 ppm.

The total content of phosphorus in the hydrophilically modified polyisocyanates according to the invention consisting of components A) and B) which may likewise be determined by the above-described ICP-OES method is not more than 20 ppm, preferably from 3 to 19 ppm, particularly preferably from 5 to 18 ppm.

However, the total content of phosphorus in the hydrophilically modified polyisocyanates according to the invention may also be calculated in simple fashion from the phosphorus contents of the polyisocyanate components A) and the hydrophilic compounds B). The calculation of the total content of phosphorus also includes the amounts of phosphorus which in the process according to the invention may be added in the form of acidic phosphorus compounds of the polyisocyanate component A) and/or of the nonionically hydrophilic organic compound B) before and/or during the reaction for stabilization or neutralization of basic catalyst residues.

Such acidic phosphorus compounds include for example phosphoric acid, phosphoric esters, for example methyl phosphate, ethyl phosphate, n-butyl phosphate, n-hexyl phosphate, 2-ethylhexyl phosphate, isooctyl phosphate, n-dodecyl phosphate, dimethyl phosphate, diethyl phosphate, di-n-propyl phosphate, di-n-butyl phosphate, di-n-amyl phosphate, di-isoamyl phosphate, di-n-decyl phosphate, diphenyl phosphate and dibenzyl phosphate, and/or phosphonic acid esters, for example methyl phosphonate, ethyl phosphonate, isopropyl phosphonate, n-propyl phosphonate, n-butyl phosphonate, isobutyl phosphonate, sec-butyl phosphonate, tert-butyl phosphonate, n-hexyl phosphonate, n-heptyl phosphonate, n-octyl phosphonate, n-decyl phosphonate, n-dodecyl phosphonate, 2-ethylhexyl phosphonate and 2-propylheptyl phosphonate.

The process according to the invention is preferably performed without solvent. If desired, however, suitable solvents inert to the reactive groups of the starting components, in particular to isocyanate groups, can also be used. Examples of suitable solvents are for example the customary coatings solvents known per se, for example ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, white spirit, relatively highly substituted aromatics, such as are commercially available, for example, under the names solvent naphtha, Solvesso®, Isopar®, Nappar® (Deutsche EXXON CHEMICAL GmbH, Cologne, DE) and Shellsol® (Deutsche Shell Chemie GmbH, Eschborn, DE), carbonic esters, such as dimethyl carbonate, diethyl carbonate, 1,2-ethylene carbonate and 1,2-propylene carbonate, lactones such as β-propiolactone, γ-butyrolactone, ε-caprolactone and ε-methylcaprolactone, but also solvents such as propylene glycol diacetate, diethylene glycol dimethyl ether, dipropylene glycol dimethyl ether, butyl glycol acetate, butyl diglycol acetate, 1,3-dioxolane, N-methylpyrrolidone and N-methylcaprolactam or any desired mixtures of such solvents.

Performing the process according to the invention comprises reacting the starting components A) and B) generally at temperatures of 40 to 180° C., preferably 50 to 150° C., while maintaining an NCO/OH equivalent ratio of 2:1 to 400:1, preferably from 4:1 to 140:1, preferably until achievement of the theoretically calculated NCO content, wherein the course of the reaction may be monitored for example by titrimetric determination of the NCO content. The NCO content is determined by preferably titrimetric means in accordance with DIN EN ISO 11909:2007-05.

The reaction of the polyisocyanate component A) with the nonionically hydrophilic compounds B) may be carried out for example up to an NCO content corresponding to complete urethanization. This reaction may be performed uncatalyzed but to accelerate reaction it is also possible to employ the customary urethanization catalysts known from polyurethane chemistry, for example tert amines such as triethylamine, pyridine, methylpyridine, benzyldimethylamine, N,N-endoethylenepiperazine, N-methylpiperidine, pentamethyldiethylenetriamine, N,N-dimethylcyclohexylamine, N,N'-dimethylpiperazine or metal salts such as iron(III) chloride, zinc chloride, zinc octoate, zinc 2-ethylcaproate, zinc acetylacetonate, tin(II) octoate, tin(II) ethylcaproate, tin(II) palmitate, dibutyltin(IV) dilaurate, zirconium(IV) 2-ethyl-1-hexanoate, zirconium(IV) neodecanoate, zirconium(IV) naphthenate, zirconium(IV) acetylacetonate, aluminum tri(ethylacetoacetate), bismuth(III) 2-ethylhexanoate, bismuth(III) octoate, bismuth(III) neodecanoate and molybdenum glycolate.

These catalysts are optionally employed in amounts of 0.001% to 2.0% by weight, preferably 0.01% to by weight, based on the total amount of the employed starting components A) and B).

However, the reaction may also be carried out according to the process described in EP-B 0 959 087 such that the urethane groups primarily formed through NCO/OH reaction are at least partially, preferably to an extent of at least 60 mol %, reacted further to afford allophanate groups. In this case reaction partners are reacted at the abovementioned NCO/OH equivalent ratio at temperatures of 40° C. to 180° C., preferably 50° C. to 150° C., generally in the presence of the catalysts suitable for accelerating the allophanation reaction as indicated in the cited patent specifications, in particular zinc compounds, for example zinc(II) n-octanoate, zinc(II) 2-ethyl-1-hexanoate or zinc(II) stearate.

These allophanatization catalysts are optionally employed in amounts of 0.001% to 2.0% by weight, preferably 0.01% to 0.2% by weight, based on the total amount of the employed starting components A) and B).

In the catalyzed reaction of components A) and B) the employed catalysts are generally chemically terminated after achieving the desired NCO content. Catalyst poisons suitable therefor include for example inorganic acids such as hydrochloric acid, phosphorous acid or phosphoric acid, acid chlorides such as acetyl chloride, benzoyl chloride or isophthaloyl chloride, sulfonic acids and sulfonic esters, such as methanesulfonic acid, p-toluenesulfonic acid, trifluoromethanesulfonic acid, perfluorobutanesulfonic acid, methyl and ethyl p-toluenesulfonate, mono- and dialkyl phosphates such as monotridecyl phosphate, dibutyl phosphate and dioctyl phosphate, but also silylated acids such as trimethylsilyl methanesulfonate, trimethylsilyl trifluoromethanesulfonate, tris(trimethylsilyl)phosphate and diethyl trimethylsilyl phosphate.

If phosphorus-containing catalyst poisons of the recited type are employed to terminate the catalysts optionally employed in the process according to the invention the phosphorus content thereof is not attributed to the total content of phosphorus of the hydrophilically modified polyisocyanate consisting of components A) and B). The total content of phosphorus in the hydrophilically modified polyisocyanates according to the invention is in this case calculated from the phosphorus contents of the polyisocyanate components A) and the hydrophilic compounds B) and optionally amounts of acidic phosphorus compounds added before and/or during conversion for stabilization or neutralization of basic catalyst residues in the process according to the invention.

When using phosphorus-free polyether alcohols or those containing less than 50 ppm of phosphorus the process according to the invention reproducibly provides uretdione structures and optionally uretonimine-containing hydrophilic polyisocyanates having a content of monomeric diisocyanates of less than 0.10% by weight based on the solids content of the uretdione structures and optionally uretonimine-containing hydrophilically modified polyisocyanates. Uretdione cleavage and uretonimine cleavage occur, if at all, to such small extents that no adverse effect on monomer content is observable. The nonionically hydrophilized polyisocyanates obtainable or obtained by the process according to the invention likewise form part of the subject matter of the present invention.

A further preferred embodiment of the invention provides nonionically hydrophilized polyisocyanates which comprise from 0.8 to 25 mol %, particularly preferably from 1 to 20 mol % and very particularly preferably from 1 to 15 mol % of uretdione structures in each case based on the total amount of all uretdione, optionally isocyanurate, iminooxadiazinedione, allophanate, biuret, urethane and/or oxadiazinetrione structures present in the polyisocyanate wherein the total amount of all iminooxadiazinedione, uretdione, isocyanurate, allophanate, biuret, urethane and/or oxadiazinetrione structures present in the polyisocyanate sums to 100 mol %, and less than 0.20 mol % of uretonimine structures based on the uretdione structures and less than 0.10% by weight of monomeric diisocyanates based on the solids content of the hydrophilically modified polyisocyanates and not more than 20 ppm of phosphorus.

A further preferred embodiment of the invention provides nonionically hydrophilized polyisocyanates which comprise from 0.8 to 25 mol % of uretdione structures based on the total amount of all uretdione, optionally isocyanurate, iminooxadiazinedione, allophanate, biuret, urethane and/or oxadiazinetrione structures present in the polyisocyanate wherein the total amount of all iminooxadiazinedione, uretdione, isocyanurate, allophanate, biuret, urethane and/or oxadiazinetrione structures present in the polyisocyanate sums to 100 mol %, and less than 0.20 mol % of uretonimine structures based on the uretdione structures and less than 0.10% by weight of monomeric diisocyanates based on the solids content of the hydrophilically modified polyisocyanates and from 3 to 19 ppm, preferably from 5 to 18 ppm, of phosphorus.

A further preferred embodiment of the invention provides nonionically hydrophilized polyisocyanates which comprise from 0.8 to 25 mol % of uretdione structures based on the total amount of all uretdione, optionally isocyanurate, iminooxadiazinedione, allophanate, biuret, urethane and/or oxadiazinetrione structures present in the polyisocyanate wherein the total amount of all iminooxadiazinedione, uretdione, isocyanurate, allophanate, biuret, urethane and/or oxadiazinetrione structures present in the polyisocyanate sums to 100 mol %, and less than 0.15 mol %, preferably less than 0.10 mol %, of uretonimine structures based on the uretdione structures and less than 0.10% by weight of monomeric diisocyanates based on the solids content of the hydrophilically modified polyisocyanates and not more than 20 ppm of phosphorus and wherein the content of uretonimine structures is particularly preferably below the limit of detection.

A further preferred embodiment of the invention provides polyether-modified polyisocyanates which comprise from 0.8 to 25 mol % of uretdione structures based on the total amount of all uretdione, optionally isocyanurate, iminooxadiazinedione, allophanate, biuret, urethane and/or oxadiazinetrione structures present in the polyisocyanate wherein the total amount of all iminooxadiazinedione, uretdione, isocyanurate, allophanate, biuret, urethane and/or oxadiazinetrione structures present in the polyisocyanate sums to 100 mol %, and less than 0.20 mol % of uretonimine structures based on the uretdione structures and less than 0.10% by weight of monomeric diisocyanates based on the solids content of the hydrophilically modified polyisocyanates and not more than 20 ppm of phosphorus obtainable or obtained by reaction of at least one polyisocyanate component A) based on PDI and/or HDI with B) at least one polyethylene glycol monomethyl ether alcohol having a statistical average of 5 to 25 ethylene oxide units.

The hydrophilic, uretdione- and optionally uretonimine-containing polyisocyanates according to the invention are valuable starting materials for producing polyurethane plastics by isocyanate polyaddition.

To this end the hydrophilically modified polyisocyanates are preferably employed in the form of aqueous emulsions which may be reacted in conjunction with polyhydroxyl compounds dispersed in water in the context of aqueous two-component systems. The very low content of monomeric diisocyanates of less than 0.10% by weight based on the solids content of the hydrophilically modified polyisocyanates ensures safe handling for commercial users.

Before emulsification the hydrophilically modified polyisocyanates produced by the process according to the invention may optionally be admixed with further non-hydrophilized polyisocyanates having aliphatically, cycloaliphatically, araliphatically and/or aromatically bonded isocyanate groups, in particular coatings polyisocyanates of the abovementioned type. In such mixtures, the process products according to the invention also assume the function of an emulsifier for the subsequently admixed proportion of non-hydrophilic polyisocyanates.

The nonionically hydrophilized polyisocyanate mixtures according to the invention are particularly preferably used as crosslinkers for coatings binders or coatings binder components dissolved or dispersed in water having isocyanate-reactive groups, in particular alcoholic hydroxyl groups, in the production of coatings using aqueous coating compositions based on such binders/binder components. The crosslinker, optionally in emulsified form, can be combined with the binders or binder components here by simple stirring by any methods prior to processing the coating compositions or even by using two-component spray guns.

Coatings binders or coatings binder components in this context include for example: hydroxyl-containing polyacrylates dissolved or dispersed in water, especially those of molecular weight range 1000 to 20,000, which constitute valuable two-component binders with organic polyisocyanates as crosslinkers or optionally urethane-modified, hydroxyl-containing polyester resins dispersed in water of the type known from polyester and alkyd resin chemistry. Reaction partners for the polyisocyanate mixtures according to the invention in principle include all binders comprising isocyanate-reactive groups that are dissolved or dispersed in water. These also include, for example, polyurethanes or polyureas dispersed in water, which are crosslinkable with polyisocyanates on account of the active hydrogen atoms present in the urethane or urea groups.

The present invention further provides a coating composition containing at least one hydrophilic uretdione-containing polyisocyanate according to the invention.

In the use according to the invention as a crosslinker component for aqueous coatings binders the hydrophilic polyisocyanates according to the invention are generally employed in amounts such that they correspond to an equivalent ratio of NCO groups to NCO-reactive groups, in particular alcoholic hydroxyl groups, of 0.5:1 to 2:1.

The hydrophilic polyisocyanates according to the invention may optionally also be added in subordinate amounts to non-functional aqueous coatings binders to achieve very specific properties, for example as an additive for adhesion promotion.

It will be appreciated that the hydrophilic polyisocyanates according to the invention may also be used in a form blocked with blocking agents known per se from polyurethane chemistry in conjunction with the abovementioned aqueous coatings binders or coatings binder components in the context of aqueous one-component PUR baking systems. Suitable blocking agents are, for example, diethyl malonate, ethyl acetoacetate, acetone oxime, butanone oxime, s-caprolactam, 3,5-dimethylpyrazole, 1,2,4-triazole, dimethyl-1,2, 4-triazole, imidazole or mixtures of any of these blocking agents.

Substrates contemplated for the aqueous coatings formulated using the hydrophilic polyisocyanates according to the invention include any desired substrates, for example, metal, wood, glass, stone, ceramic materials, concrete, rigid and flexible plastics, textiles, leather, and paper, which prior to coating may optionally also be provided with customary primers.

The aqueous coating compositions formulated with the hydrophilic polyisocyanates according to the invention and which may optionally be admixed with the customary auxiliary and additive substances customary in the coatings sector, for example flow control agents, color pigments, fillers, matting agents or emulsifiers, have good coatings properties even in the case of room-temperature drying.

However, it will be appreciated that they may also be dried under forced conditions at elevated temperature or by baking at temperatures up to 260° C.

The present invention further provides a substrate coated with an optionally heat-cured coating composition according to the invention.

On account of their excellent water emulsifiability, which allows a homogeneous, particularly finely divided distribution in aqueous coatings binders, the use of the hydrophilic polyisocyanates according to the invention as a crosslinker component for aqueous polyurethane coatings affords coatings with exceptional optical properties, especially high surface gloss, flow and high transparency.

In addition to the preferred use as crosslinker components for aqueous 2K-PUR coatings of the hydrophilic polyisocyanates according to the invention are exceptionally suitable as crosslinkers for aqueous dispersion adhesives, leather and textile coatings or textile printing pastes, as paper auxiliaries that are free from adsorbable organically bonded halogens (AOX) or else as additives for mineral building materials, for example concrete or mortar compositions.

The features specified as preferred for the process according to the invention are also preferred for the further subject matter of the invention.

The examples which follow serve to illustrate the present invention, but should in no way be understood as imposing any restriction on the scope of protection.

EXAMPLES

All percentages are based on weight unless otherwise stated.

NCO contents were determined titrimetrically according to DIN EN ISO 11909:2007-05.

All viscosity measurements were recorded with a Physica MCR 51 rheometer from Anton Paar Germany GmbH (DE) in accordance with DIN EN ISO 3219:1994-10 at a shear rate of 250 s−1.

Residual monomer contents were measured according to DIN EN ISO 10283:2007-11 by gas chromatography with an internal standard.

The platinum-cobalt color number was measured by spectrophotometry according to DIN EN ISO 6271-2:2005-03 with a LICO 400 spectrophotometer from Lange, Germany.

The contents (mol %) of the uretdione, optionally isocyanurate, iminooxadiazinedione, allophanate, biuret, urethane and/or oxadiazinetrione structures present in the polyisocyanates A) were calculated from the integrals of proton-decoupled $^{13}$C NMR spectra (recorded on a Bruker DPX-400 instrument) and are in each case based on the sum of uretdione, isocyanurate, allophanate, biuret, iminooxadiazinedione and/or oxadiazinetrione structures present. The contents (mol %) of any uretonimine structures present in the polyisocyanates A) were likewise calculated from the integrals of the proton-decoupled $^{13}$C-NMR spectra and refer to uretdione structures. In the case of HDI polyisocyanates in $CDCl_3$, the individual structural elements have the following chemical shifts (in ppm): uretdione: 157.1; isocyanurate: 148.4; iminooxadiazinedione: 147.8, 144.3 and 135.3; allophanate: 155.7 and 153.8, biuret: 155.5; urethane: 156.3; oxadiazinetrione: 147.8 and 143.9; uretonimine 158.7 and 144.6.

The phosphorus contents in the starting polyisocyanates A) and nonionically hydrophilic organic compounds B) were determined by inductively coupled plasma atomic emission spectroscopy (ICP-OES) according to DIN EN ISO 11885:2009-09 after microwave digestion. The limit of detection with this method is <1 ppm.

Starting Compounds

Polyisocyanates A)

Starting Polyisocyanate A1)

Polyisocyanate produced by catalytic trimerization of HDI based on Example 11 of EP-A 330 966 with the exception that the reaction was terminated by addition of dibutyl phosphate at an NCO content of the crude mixture of 40%. Subsequently, unconverted HDI was removed by thin-film distillation at a temperature of 130° C. and a pressure of 0.2 mbar.

The Product had the Following Characteristics and Composition:

NCO content: 21.7%
    Monomeric HDI: 0.06%
    Viscosity (23° C.): 3080 mPas
    Color index (Hazen): 8
    Phosphorus content: 8 ppm
    Uretdione structures: 0.9 mol %
    Isocyanurate structures: 90.1 mol %
    Iminooxadiazinedione structures: 3.6 mol %
    Allophanate structures: 5.4 mol %
    Uretonimine structures: not detectable Starting Polyisocyanate A2)

Polyisocyanate produced on the basis of comparative example 2a of WO 2018/153801 by trimerization of HDI using a 20% solution of 5-azonia-spiro[4.5]decanium hydrogendifluoride in 2-ethylhexanol as catalyst, reaction termination at an NCO content of the crude mixture of 44.8% by addition of an amount equivalent to the catalyst amount of a 70% solution of dodecylbenzenesulfonic acid in isopropanol and subsequent separation of the unconverted HDI by thin-film distillation at a temperature of 130° C. and a pressure of 0.2 mbar.

The Product had the Following Characteristics and Composition:

NCO content: 23.5%
Monomeric HDI: 0.11%
Viscosity (23° C.): 720 mPas
Color index (Hazen): 49
Phosphorus content: <1 ppm
Uretdione structures: 4.9 mol %
Isocyanurate structures: 46.7 mol %
Iminooxadiazinedione structures: 48.4 mol %
Uretonimine structures: undetectable Starting Polyisocyanate A3)

Polyisocyanate produced by thermal dimerization and subsequent hexamethyldisilazane-catalyzed trimerization of HDI according to example 4 of US 2004/0106762.

The Product had the Following Characteristics and Composition:

NCO content: 23.1%
Monomeric HDI: 0.10%
Viscosity (23° C.): 710 mPas
Color index (Hazen): 8
Phosphorus content: <1 ppm
Uretdione structures: 19.9 mol %
Isocyanurate structures: 69.7 mol %
Urethane structures: 10.4 mol %
Uretonimine structures: 0.15 mol % (based on uretdione structures)

Starting Polyisocyanate A4)

Polyisocyanate produced according to Example 11 of EP-A 330 966 with the exception that 2-ethylhexanol was used as the catalyst solvent instead of 2-ethyl-1,3-hexanediol and the reaction was terminated by addition of dibutyl phosphate at an NCO content of the crude mixture of 42.5%. Subsequently, unconverted HDI was removed by thin-film distillation at a temperature of 130° C. and a pressure of 0.2 mbar.

The Product had the Following Characteristics and Composition:

NCO content: 22.9%
Monomeric HDI: 0.08%
Viscosity (23° C.): 1210 mPas
Color index (Hazen): 10
Phosphorus content: 14 ppm
Uretdione structures: 1.9 mol %
Isocyanurate structures: 89.0 mol %
Iminooxadiazinedione structures: 4.3 mol %
Allophanate structures: 4.8 mol %
Uretonimine structures: undetectable Nonionically Hydrophilic Organic Compound B)

B1) Methoxypolyethylene glycol MPEG 350,
OH number: 160 mg KOH/g, equivalent weight: 351 g/mol
pH: 6.3
Phosphorus content: <1 ppm B2) Methoxypolyethylene glycol MPEG 350,
OH number: 162 mg KOH/g, equivalent weight: 346 g/mol
pH: 3.7
Phosphorus content: 120 ppm B3) Methoxypolyethylene glycol MPEG 500,
OH number: 112 mg KOH/g, equivalent weight: 501 g/mol
pH: 4.9
Phosphorus content: <1 ppm B4) Methoxypolyethylene glycol MPEG 500,
OH number: 111 mg KOH/g, equivalent weight: 505 g/mol pH: 3.9
Phosphorus content: 110 ppm

Example 1 (Inventive)

870 g (4.50 equivalents) of the polyisocyanate component A1) were initially charged at 100° C. under dry nitrogen with stirring, admixed with 130 g (0.37 equivalents) of the nonionically hydrophilic organic compound B1) over 30 min and at this temperature subjected to further stirring until the NCO content of the mixture had fallen to a value corresponding to complete urethanization after about 2 h. Cooling to room temperature afforded a colorless, completely clear polyisocyanate mixture having the following characteristics:

NCO content: 17.2%
Monomeric HDI: 0.05%
Viscosity (23° C.): 3410 mPas
Color index (Hazen): 10
P content (calculated): 7 ppm

Example 2 (Inventive)

Example 1 was repeated, the polyisocyanate component A1) being admixed with 0.5 g (50 ppm based on the total batch) of dibutyl phosphate as stabilizer before commencement of addition of the nonionically hydrophilic organic compound B1). This afforded a colorless, completely clear polyisocyanate mixture having the following characteristics:

NCO content: 17.3%
Monomeric HDI: 0.07%
Viscosity (23° C.): 3290 mPas
Color index (Hazen): 10
P content (calculated): 14.3 ppm

Example 3 (Comparative)

870 g (4.50 equivalents) of the polyisocyanate component A1) were reacted with 130 g (0.38 equivalents) of the nonionically hydrophilic organic compound B2) according to the process described in example 1. This afforded a colorless, completely clear hydrophilically modified polyisocyanate having the following characteristics:

NCO content: 17.3%
Monomeric HDI: 0.12%
Viscosity (23° C.): 3200 mPas
Color index (Hazen): 9
P content (calculated): 22.6 ppm

Example 4 (Inventive)

830 g (4.64 equivalents) of the polyisocyanate component A2) were initially charged at 100° C. under dry nitrogen with stirring, admixed with 170 g (0.48 equivalents) of the nonionically hydrophilic organic compound B1) over 30 min and at this temperature subjected to further stirring until the NCO content of the mixture had fallen to a value corresponding to complete urethanization after about 2 h. Cooling to room temperature afforded a slightly yellow, completely clear hydrophilically modified polyisocyanate having the following characteristics:

NCO content: 17.5%
Monomeric HDI: 0.09%
Viscosity (23° C.): 815 mPas
Color index (Hazen): 37
P content (calculated): <1 ppm

Example 5 (Comparative)

830 g (4.64 equivalents) of the polyisocyanate component A2) were reacted with 170 g (0.48 equivalents) of the nonionically hydrophilic organic compound B2) according to the process described in example 3. This afforded a slightly yellow, completely clear hydrophilically modified polyisocyanate mixture having the following characteristics:

NCO content: 17.5%
Monomeric HDI: 0.13%
Viscosity (23° C.): 810 mPas
Color index (Hazen): 34
P content (calculated): 20.4 ppm

Example 6 (Inventive)

800 g (4.40 equivalents) of the polyisocyanate component A3) were initially charged at 80° C. under dry nitrogen with stirring, admixed with 200 g (0.40 equivalents) of the nonionically hydrophilic organic compound B3) over 30 min and at this temperature subjected to further stirring until the NCO content of the mixture had fallen to a value corresponding to complete urethanization after about 3.5 h. Cooling to room temperature afforded a slightly yellow, completely clear hydrophilically modified polyisocyanate having the following characteristics:

Examples 1, 2, 4 and 6 demonstrate that reaction of the starting polyisocyanates A1), A2) and A3) containing uretdione structures and less than 0.20 mol % of uretonimine structures based on the uretdione structures with phosphorus-free polyether alcohols at 100° C. affords nonionically hydrophilized polyisocyanates having monomer contents of less than 0.10%. By contrast, comparative examples 3, 5 and 7 show that reaction of the starting polyisocyanates A1), A2) and A3) with polyether alcohols containing more than 50 ppm of phosphorus affords hydrophilically modified polyisocyanates having monomer contents of more than 0.10% when the amount of phosphorus in the respective starting polyisocyanate and polyether alcohol sums to more than 20 ppm.

Examples 8 to 13 (Inventive and Comparative)

Using the process described in Example 1, the polyisocyanate components A1) and A4) were each reacted with nonionically hydrophilic organic compounds consisting of mixtures of the polyether alcohols B1) and B2) and containing different amounts of phosphorus. The table which follows shows the respective compositions of the reaction mixtures, the total phosphorus contents of the polyether component and the polyisocyanate component and the characteristics of the obtained reaction products.

| Example | | 8 | 9 Comparative | 10 | 11 Comparative | 12 | 13 Comparative |
|---|---|---|---|---|---|---|---|
| Polyisocyanate component A1) | [parts by wt.] | 70.0 | 70.0 | 75.0 | 75.0 | — | — |
| Polyisocyanate component A4) | [parts by wt.] | — | — | — | — | 98.0 | 98.0 |
| Polyether component B1) | [parts by wt] | 20.0 | 15.0 | 14.5 | 12.5 | 1.2 | 1.0 |
| Polyether component B2) | [parts by wt] | 10.0 | 15.0 | 10.5 | 12.5 | 0.8 | 1.0 |
| Dibutyl phosphate | [ppm] | — | — | — | — | 30 | 50 |
| Total P content, polyether component | [ppm] | 40 | 60 | 50 | 60 | 48 | 60 |
| Total P content, hydrophilic polyisocyanate* | [ppm] | 17.6 | 23.6 | 18.5 | 21.0 | 19.1 | 22.3 |
| NCO content | [%] | 11.6 | 11.6 | 13.3 | 13.3 | 22.2 | 22.2 |
| Monomeric HDI: | [%] | 0.06 | 0.11 | 0.07 | 0.11 | 0.08 | 0.12 |
| Viscosity (23° C.) | [mPas] | 3600 | 3580 | 3510 | 3570 | 1240 | 1245 |
| Color index (Hazen): | | 9 | 8 | 8 | 8 | 11 | 10 |

*including P from dibutyl phosphate (stabilizer)

NCO content: 16.8%
Monomeric HDI: 0.07%
Viscosity (23° C.): 835 mPas
Color index (Hazen): 7
P content (calculated): <1 ppm

Example 7 (Comparative)

800 g (4.13 equivalents) of the polyisocyanate component A3) were reacted with 200 g (0.40 equivalents) of the nonionically hydrophilic organic compound B4) according to the process described in example 5. This afforded a colorless, completely clear hydrophilically modified polyisocyanate having the following characteristics:

NCO content: 15.7%
Monomeric HDI: 0.13%
Viscosity (23° C.): 260 mPas
Color index (Hazen): 8
P content (calculated): 22.0 ppm Examples 8, 10 and 12 demonstrate that reaction of the starting polyisocyanates A1) and A4) containing uretdione structures and less than 0.20 mol % of uretonimine structures based on the uretdione structures with polyether alcohols having a phosphorus content of not more than 50 ppm at 100° C. affords nonionically hydrophilized polyisocyanates having monomer contents of less than 0.10% when their total content of phosphorus is not more than 20 ppm.

By contrast, starting from the same polyisocyanate components in conjunction with polyether alcohol mixtures containing more than 50 ppm of phosphorus, comparative examples 9, 11 and 13 afforded hydrophilically modified polyisocyanates having monomer contents of in each case more than 0.10% at total phosphorus contents in the reaction mixture of more than 20 ppm.

The invention claimed is:
1. A process for producing hydrophilically modified polyisocyanates having a content of monomeric diisocya- nates of less than 0.10% by weight based on the solids content of the hydrophilically modified polyisocyanates comprising reaction of A) at least one polyisocyanate component having aliphatically, cycloaliphatically, araliphatically and/or aromatically bonded isocyanate groups which comprises at least uretdione structures and uretonimine structures at most in amounts which are below a detection limit by means of 400 MHz proton-decoupled $^{13}C$ NMR with B) at least one nonionically hydrophilic organic compound comprising at least one isocyanate-reactive group, wherein the nonionically hydrophilic organic compound B) has a content of phosphorus of not more than 50 ppm and a total content of phosphorus based on components A) and B) of the hydrophilically modified polyisocyanate is not more than 20 ppm.

2. The process as claimed in claim 1, wherein the polyisocyanate component A) has a content of uretdione structures of at least 0.6 mol % in each case based on the total amount of all uretdione, optionally isocyanurate, iminooxadiazinedione, allophanate, biuret, urethane and/or oxadiazinetrione structures present in the polyisocyanate, wherein the total amount of all iminooxadiazinedione, uretdione, isocyanurate, allophanate, biuret, urethane and/or oxadiazinetrione structures present in the polyisocyanate sums to 100 mol %.

3. The process as claimed in claim 1, wherein the polyisocyanate component A) contains at least uretdione and isocyanurate structures.

4. The process as claimed in claim 1, wherein the polyisocyanate component A) has exclusively aliphatically and/or cycloaliphatically bonded isocyanate groups.

5. The process as claimed in claim 1, wherein the polyisocyanate component A) is based on PDI, HDI, IPDI and/or 2,4'- and 4,4'-diisocyanatodicyclohexylmethane.

6. The process as claimed in claim 1, wherein the nonionically hydrophilic organic compound B) is selected from monohydric or polyhydric polyalkylene oxide polyether alcohols having a statistical average of 5 to 50 ethylene oxide units per molecule.

7. The process as claimed in claim 6, wherein the nonionically hydrophilic organic compound B) is selected from pure polyethylene oxide polyether alcohols or mixed polyalkylene oxide polyether alcohols whose alkylene oxide units comprise at least 70 mol % of ethylene oxide units.

8. The process as claimed in claim 6, wherein the nonionically hydrophilic compound B) has a pH, measured as a 5% solution in water, of 4.0 to 8.0.

9. The process as claimed in claim 1, wherein the nonionically hydrophilic compounds B) are employed in an amount of up to 30% by weight, based on the total amount of the employed starting components A) and B).

10. The process as claimed in claim 1, wherein the nonionically hydrophilic organic compound B) has a content of phosphorus of not more than 40 ppm, wherein the phosphorus contents are determined by inductively coupled plasma atomic emission spectroscopy (ICP-OES) according to DIN EN ISO 11885:2009-09 after microwave digestion.

11. The process as claimed in claim 1, wherein the total content of phosphorus in the hydrophilically modified polyisocyanate consisting of components A) and B) is from 3 to 19 ppm.

12. A nonionically hydrophilized polyisocyanate comprising uretdione structures and uretonimine structures at most in amounts which are below a detection limit by means of 400 MHz proton-decoupled $^{13}C$ NMR and less than 0.10% by weight of monomeric diisocyanates based on the solids content of the hydrophilically modified polyisocyanates and not more than 20 ppm of phosphorus.

13. A method of producing polyurethane plastics comprising providing as a starting component the nonionically hydrophilized polyisocyanates as claimed in claim 12.

14. A coating composition containing nonionically hydrophilized polyisocyanates as claimed in claim 12.

15. A substrate coated with an optionally heat-cured coating composition as claimed in claim 14.

* * * * *